US008283068B2

(12) United States Patent
Sumihiro et al.

(10) Patent No.: US 8,283,068 B2
(45) Date of Patent: Oct. 9, 2012

(54) ALKALINE DRY BATTERY

(75) Inventors: Yasushi Sumihiro, Hyogo (JP); Seiji Wada, Osaka (JP); Michiko Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 1101 days.

(21) Appl. No.: 12/099,969

(22) Filed: Apr. 9, 2008

(65) Prior Publication Data
US 2008/0254364 A1 Oct. 16, 2008

(30) Foreign Application Priority Data
Apr. 10, 2007 (JP) ................... 2007-102662

(51) Int. Cl.
| H01M 6/04 | (2006.01) |
| H01M 10/26 | (2006.01) |
| H01M 4/00 | (2006.01) |
| H01M 4/13 | (2010.01) |
| H01M 4/50 | (2010.01) |
| H01M 4/42 | (2006.01) |

(52) U.S. Cl. ......... 429/206; 429/223; 429/224; 429/229
(58) Field of Classification Search ................... 429/206, 429/229, 223, 224
See application file for complete search history.

(56) References Cited

U.S. PATENT DOCUMENTS
| 5,622,612 A | 4/1997 | Mihara et al. | |
| 2004/0115532 A1* | 6/2004 | Malservisi et al. | ........... 429/229 |
| 2004/0157120 A1* | 8/2004 | Wu et al. | ........... 429/174 |
| 2005/0130041 A1* | 6/2005 | Fensore, III | ........... 429/229 |
| 2006/0003225 A1* | 1/2006 | Okubo et al. | ........... 429/206 |
| 2006/0083985 A1* | 4/2006 | Dunham | ........... 429/185 |
| 2006/0172193 A1* | 8/2006 | Iwamoto et al. | ........... 429/185 |

FOREIGN PATENT DOCUMENTS
| JP | 08-017437 | 1/1996 |
| JP | 2002-190303 | 7/2002 |
| JP | 2004-095475 | 3/2004 |

OTHER PUBLICATIONS

"Electrical Resistivity", 2010, http://www.calculator.org/property.aspx?name=electrical%20resistivity.*
"Resistance and Resistivity", Jul. 8, 2011, http://resources.schoolscience.co.uk/cda/16plus/copelech2pg1.html.*
European Search Report issued in Patent Application No. 08153903.3-1227 dated on Jul. 18, 2008.

* cited by examiner

*Primary Examiner* — Eugenia Wang
(74) *Attorney, Agent, or Firm* — McDermott Will & Emery LLP

(57) ABSTRACT

An alkaline dry battery of this invention includes: a cylindrical positive electrode mixture having a hollow and including at least one of manganese dioxide powder and nickel oxyhydroxide powder; a gelled negative electrode including zinc alloy powder; a separator interposed between the positive electrode mixture and the gelled negative electrode; a negative electrode current collector inserted into the gelled negative electrode; and a negative electrode terminal plate electrically connected to the negative electrode current collector. The gelled negative electrode is filled in the hollow of the positive electrode mixture with the separator interposed therebetween. The height L1 of the gelled negative electrode filled therein and the length L2 of the portion of the negative electrode current collector inserted in the gelled negative electrode satisfy the relation (1): $0.72 \leq L2/L1 \leq 0.86$.

6 Claims, 1 Drawing Sheet

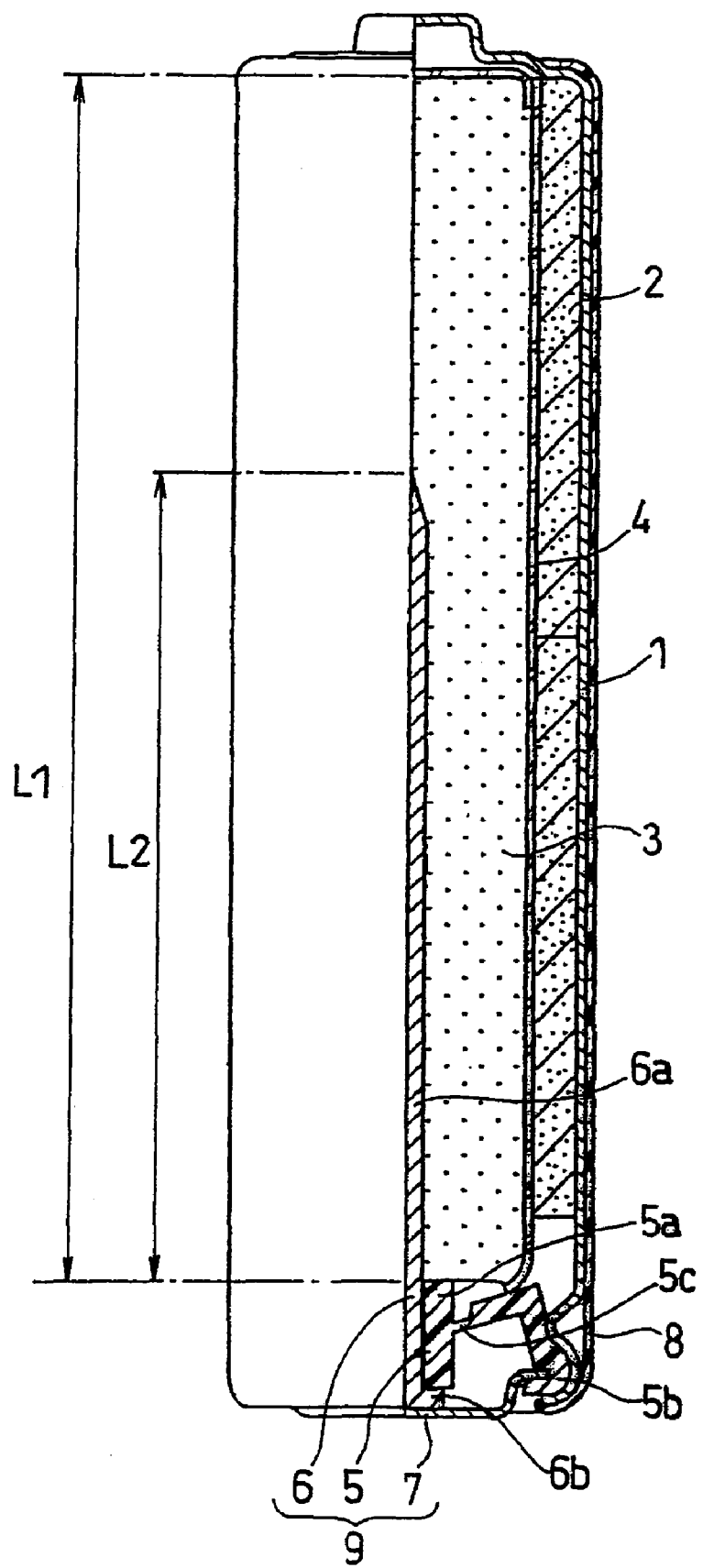

ALKALINE DRY BATTERY

FIELD OF THE INVENTION

The invention relates to an improvement in heavy load discharge characteristic of an alkaline dry battery.

BACKGROUND OF THE INVENTION

Alkaline dry batteries are used as a power source for electronic devices such as digital still cameras, and various attempts have been made to improve the heavy load discharge characteristic of alkaline dry batteries. Examples of such attempts include improvement of active materials and optimization of the amounts of filled active materials for heightening reaction efficiency and reduction of internal resistance, and thinning the components of alkaline dry batteries for increasing the internal volume thereof.

In addition, to improve the heavy load discharge characteristic, heightening the current collection efficiency of the gelled negative electrode has also been examined. For example, Japanese Laid-Open Patent Publication No. 2004-95475 proposes the use of a negative electrode current collector that is shaped like a plate, a spiral or a bundle of thin fibers, or a negative electrode current collector composed of a combination of a plurality of such shapes, in order to increase the current collection area.

In commercially-available, AA-size cylindrical alkaline dry batteries, the diameter of the body of the negative electrode current collector (the columnar portion inserted into the gelled negative electrode) is 1.3 to 1.5 mm, the height of the gelled negative electrode filled (the length in the axial direction of the cylindrical alkaline dry battery) is approximately 42 mm, and the length of the portion of the body of the negative electrode current collector inserted into the gelled negative electrode is approximately 65% of the height of the gelled negative electrode filled.

Japanese Laid-Open Patent Publication No. 2002-190303 proposes setting the length of the portion of the negative electrode current collector inserted into the gelled negative electrode to a dimension equivalent to the height of the filled gelled negative electrode, in order to maximize the current collecting efficiency.

However, such negative electrode current collectors are difficult to produce or work and require high production costs, so their practical utilization is difficult. The effect of the surface area (current collection area) of the negative electrode current collector on the discharge characteristics and the effect of the length of the portion of the negative electrode current collector inserted into the gelled negative electrode on the heavy load discharge characteristic differ according to the size of the alkaline dry battery such as the D-size or AA-size. The heavy load discharge characteristic is believed to be dependent on the length of the gelled negative electrode in the axial direction of the cylindrical alkaline dry battery.

As in Japanese Laid-Open Patent Publication No. 2004-95475, when the shape of the negative electrode current collector is changed to increase the current collection area of the negative electrode current collector, the volume of the negative electrode current collector may increase and the volume of the filled gelled negative electrode may decrease in a corresponding amount, thereby resulting in a reduction in battery capacity. Thus, the greatest care should be given to the balance between the current collecting efficiency and the amount of active material.

In order to solve the conventional art problems discussed above, it is an object of the invention to provide an alkaline dry battery having excellent heavy load discharge characteristic while having a simple and inexpensive structure.

BRIEF SUMMARY OF THE INVENTION

To achieve the aforementioned object, a first alkaline dry battery according to the invention is an alkaline dry battery including: a cylindrical positive electrode mixture having a hollow and including at least one of manganese dioxide powder and nickel oxyhydroxide powder; a gelled negative electrode filled in the hollow of the positive electrode mixture and including zinc alloy powder; a separator interposed between the positive electrode mixture and the gelled negative electrode; a negative electrode current collector inserted into the gelled negative electrode; and a negative electrode terminal plate electrically connected to the negative electrode current collector. This battery is characterized in that the height $L1$ of the gelled negative electrode filled in the hollow of the positive electrode mixture and the length $L2$ of the portion of the negative electrode current collector inserted in the gelled negative electrode satisfy the relation (1): $0.72 \leq L2/L1 \leq 0.86$.

A second alkaline dry battery according to the invention is an alkaline dry battery including: a cylindrical positive electrode mixture having a hollow and including at least one of manganese dioxide powder and nickel oxyhydroxide powder; a gelled negative electrode filled in the hollow of the positive electrode mixture and including zinc alloy powder; a separator interposed between the positive electrode mixture and the gelled negative electrode; a negative electrode current collector inserted into the gelled negative electrode; and a negative electrode terminal plate electrically connected to the negative electrode current collector. This battery is characterized in that the height $L1$ of the gelled negative electrode filled in the hollow of the positive electrode mixture and the length $L2$ of the portion of the negative electrode current collector inserted in the gelled negative electrode satisfy the relation (2): $0.9 P_{max} \leq L2/L1 \leq 1.07 P_{max}$ where $P_{max}$ represents the ratio of $L2$ to $L1$ at which a maximum number of cycles of pulse discharge to a cut-off closed-circuit voltage of 1.05 V is obtained. Each of the cycles of pulse discharge comprises a 2-second discharge at a constant resistance of 1.5 W and a 28-second discharge at a constant resistance of 0.65 W, and this cycle is repeated 10 cycles per hour.

A third alkaline dry battery according to the invention is an alkaline dry battery including: a cylindrical positive electrode mixture having a hollow and including at least one of manganese dioxide powder and nickel oxyhydroxide powder; a gelled negative electrode filled in the hollow of the positive electrode mixture and including zinc alloy powder; a separator interposed between the positive electrode mixture and the gelled negative electrode; a negative electrode current collector having a rod-like body inserted into the gelled negative electrode and a head at one end of the body; and a negative electrode terminal plate electrically connected to the head of the negative electrode current collector. This battery is characterized in that the body of the negative electrode current collector is in the shape of a column with a diameter of 1.0 to 1.3 mm, and that the height $L1$ of the gelled negative electrode filled in the hollow of the positive electrode mixture and the length $L2$ of the portion of the negative electrode current collector inserted in the gelled negative electrode satisfy the relation (3): $0.72 \leq L2/L1 \leq 0.86$.

The negative electrode current collector preferably has a volume resistivity of $16 \times 10^{-3}$ $\mu\Omega \cdot m$ or more and $55 \times 10^{-3}$ $\mu\Omega \cdot m$ or less.

The negative electrode current collector preferably comprises copper or brass containing 76% or more of copper by weight.

The invention can improve the heavy load discharge characteristic of an alkaline dry battery by deriving the effective lengths of the opposing gelled negative electrode and negative electrode current collector for obtaining the maximum current collecting efficiency and achieving a good balance between the length of the portion of the negative electrode current collector inserted into the gelled negative electrode and the loss of the volume of the filled gelled negative electrode due to the insertion of the negative electrode current collector.

While the novel features of the invention are set forth particularly in the appended claims, the invention, both as to organization and content, will be better understood and appreciated, along with other objects and features thereof, from the following detailed description taken in conjunction with the drawing.

BRIEF DESCRIPTION OF THE DRAWING

FIG. 1 is a partially sectional front view of a AA-size alkaline dry battery in one embodiment of the invention.

DETAILED DESCRIPTION OF THE INVENTION

The first alkaline dry battery according to the invention is an alkaline dry battery including: a cylindrical positive electrode mixture having a hollow and including at least one of manganese dioxide powder and nickel oxyhydroxide powder; a gelled negative electrode filled in the hollow of the positive electrode mixture and including zinc alloy powder; a separator interposed between the positive electrode mixture and the gelled negative electrode; a negative electrode current collector inserted into the gelled negative electrode; and a negative electrode terminal plate electrically connected to the negative electrode current collector. This battery is characterized in that the height $L1$ of the gelled negative electrode filled in the hollow of the positive electrode mixture and the length $L2$ of the portion of the negative electrode current collector inserted in the gelled negative electrode satisfy the relation (1): $0.72 \leq L2/L1 \leq 0.86$.

This configuration can improve the heavy load discharge characteristic of the alkaline dry battery. The $L2/L1$ ratio is preferably 0.77 to 0.80.

The second alkaline dry battery according to the invention is an alkaline dry battery including: a cylindrical positive electrode mixture having a hollow and including at least one of manganese dioxide powder and nickel oxyhydroxide powder; a gelled negative electrode filled in the hollow of the positive electrode mixture and including zinc alloy powder; a separator interposed between the positive electrode mixture and the gelled negative electrode; a negative electrode current collector inserted into the gelled negative electrode; and a negative electrode terminal plate electrically connected to the negative electrode current collector. This battery is characterized in that the height $L1$ of the gelled negative electrode filled in the hollow and the length $L2$ of the portion of the negative electrode current collector inserted in the gelled negative electrode satisfy the relation (2): $0.9 Pmax \leq L2/L1 \leq 1.07 Pmax$ where Pmax represents the ratio of $L2$ to $L1$ at which a maximum number of cycles of pulse discharge to a cut-off closed-circuit voltage of 1.05 V is obtained. Each of the cycles of pulse discharge comprises a 2-second discharge at a constant resistance of 1.5 W and a 28-second discharge at a constant resistance of 0.65 W, and this cycle is repeated 10 cycles per hour.

This configuration can improve the heavy load discharge characteristic of the alkaline dry battery. The $L2/L1$ ratio is preferably 0.96Pmax to 1.00Pmax.

The third alkaline dry battery according to the invention is an alkaline dry battery including: a cylindrical positive electrode mixture having a hollow and including at least one of manganese dioxide powder and nickel oxyhydroxide powder; a gelled negative electrode filled in the hollow of the positive electrode mixture and including zinc alloy powder; a separator interposed between the positive electrode mixture and the gelled negative electrode; a negative electrode current collector having a rod-like body inserted into the gelled negative electrode and a head at one end of the body; and a negative electrode terminal plate electrically connected to the head of the negative electrode current collector. This battery is characterized in that the body of the negative electrode current collector is in the shape of a column with a diameter of 1.0 to 1.3 mm, and that the height $L1$ of the gelled negative electrode filled in the hollow and the length $L2$ of the portion of the negative electrode current collector inserted in the gelled negative electrode satisfy the relation (3): $0.72 \leq L2/L1 \leq 0.86$.

This configuration can improve the heavy load discharge characteristic while employing a simple and inexpensive structure. Also, by changing the diameter and length of the body of the negative electrode current collector, the current collection area and reaction efficiency can be easily controlled. The $L2/L1$ ratio is preferably 0.77 to 0.80.

The volume resistivity of the negative electrode current collector is preferably $16 \times 10^{-3}$ to $55 \times 10^{-3}$ $\mu\Omega \cdot m$. Even in the event that the alkaline dry battery becomes accidentally short-circuited, the negative electrode current collector is prevented from heating up due to short-circuit current through the negative electrode terminal plate. It is thus possible to suppress thermal damage to the circuit of the electronic or other device upon a battery short-circuit. Hence, the reliability of the alkaline dry battery as well as the heavy load discharge characteristic is improved.

The negative electrode current collector preferably comprises copper or brass containing 76% or more of copper by weight since such material is inexpensive and readily available.

Referring now to FIG. 1, an alkaline dry battery in one embodiment of the invention is described. FIG. 1 is a partially sectional front view of a AA-size alkaline dry battery (LR6) in one embodiment of the invention.

A cylindrical battery case 1 with a bottom, serving as the positive electrode current collector, contains a cylindrical positive electrode mixture 2 having a hollow. The battery case 1 has a positive electrode terminal 1a on the bottom and is in contact with the positive electrode mixture 2. A gelled negative electrode 3 is filled in the hollow of the positive electrode mixture 2 with a cylindrical separator 4 having a bottom interposed therebetween. The opening of the battery case 1 is sealed with a seal assembly 9.

The seal assembly 9 comprises: a nail-shaped negative electrode current collector 6 having a body 6a and a head 6b; a negative electrode terminal plate 7 having a disc-like flat part in contact with the negative electrode current collector 6, and a brim around the flat part; and a gasket 5. The gasket 5 is composed of a central cylindrical part 5a, an outer peripheral cylindrical part 5b, and a connecting part connecting the central cylindrical part 5a and the outer peripheral cylindrical part 5b. The body 6a of the negative electrode current collector 6 is inserted into the gelled negative electrode 3.

The negative electrode terminal plate 7 has vent holes (not shown) for releasing the gas inside the battery, for example, at the border between the brim and the flat part. In the event that the internal pressure of the battery rises abnormally, a thinned section 5c formed in the connecting part of the gasket 5 breaks, so that the gas can be released from the vent holes.

In the seal assembly 9, the body 6a of the negative electrode current collector 6 is inserted through the opening of the central cylindrical part 5a, and the head 6b of the negative electrode current collector 6 is electrically connected to the flat part of the negative electrode terminal plate 7 by welding or the like. The open edge of the battery case 1 is crimped onto the peripheral edge (brim) of the negative electrode terminal plate 7 with the outer peripheral cylindrical part 5b of the gasket 5 interposed therebetween. In this way, the opening of the battery case 1 is sealed.

At this time, only a predetermined portion (length) of the body 6a of the negative electrode current collector 6 is inserted into the center of the gelled negative electrode 3 along the axial direction of the positive electrode mixture 2. At the portion of the negative electrode current collector 6 inserted in the gelled negative electrode 3, the negative electrode current collector 6 comes in contact with the gelled negative electrode 3, so that current is effectively collected. The outer surface of the battery case 1 is covered with an exterior label 8.

The first alkaline dry battery of the invention has the same configuration as the above-described alkaline dry battery, and the height L1 of the gelled negative electrode 3 filled in the hollow of the positive electrode mixture 2 and the length L2 of the portion of the negative electrode current collector 6 inserted in the gelled negative electrode 3 satisfy the above relation (1). As used herein, the height L1 and the length L2 are the height and the length in the direction substantially parallel to the axial direction of the cylindrical alkaline dry battery (i.e., the axial direction of the positive electrode mixture 2) shown in FIG. 1, and are hereinafter referred to as simply the height L1 of the filled gelled negative electrode and the length L2 of the inserted negative electrode current collector. This configuration can improve the heavy load discharge characteristic.

The second alkaline dry battery of the invention has the same configuration as the above-described alkaline dry battery, and the height L1 of the filled gelled negative electrode 3 and the length L2 of the inserted negative electrode current collector 6 satisfy the above relation (2) where Pmax represents the ratio of L2 to L1 at which a maximum number of cycles of pulse discharge to a cut-off closed-circuit voltage of 1.05 V is obtained. Each of the cycles of pulse discharge comprises a 2-second discharge at a constant resistance of 1.5 W and a 28-second discharge at a constant resistance of 0.65 W, and this cycle is repeated 10 cycles per hour. This configuration can enable the above improvement in the heavy load discharge characteristic regardless of the electrical characteristics of the gelled negative electrode 3.

The third alkaline dry battery of the invention has the same configuration as the above-described alkaline dry battery, and the diameter of the cylindrical body 6a in a cross-section substantially perpendicular to the axial direction of the positive electrode mixture 2 (excluding the tip which is described below) is 1.0 to 1.3 mm. Also, the height L1 of the filled gelled negative electrode 3 and the length L2 of the inserted negative electrode current collector 6 satisfy the above relation (3). This configuration can improve the heavy load discharge characteristic while employing a simple and inexpensive structure. It should be noted that the body 6a illustrated in FIG. 1 has a conical tip at the end opposite to the head 6b. The length of the body 6a is, for example, 35.5 to 41.5 mm.

The positive electrode mixture 2, the separator 4, and the gelled negative electrode 3 contain an alkaline electrolyte. The alkaline electrolyte is, for example, an alkaline aqueous solution containing 30 to 40% by weight of potassium hydroxide and 1 to 3% by weight of zinc oxide.

The battery case 1 is prepared by pressing, for example, a nickel-plated steel plate into predetermined dimensions and shape. Also, the separator 4 is, for example, a non-woven fabric composed mainly of polyvinyl alcohol fiber and rayon fiber.

The positive electrode mixture 2 is, for example, a mixture of a positive electrode active material including at least one of manganese dioxide powder and nickel oxyhydroxide powder, a conductive material such as graphite powder, and an alkaline electrolyte. If necessary, this mixture may contain a binder such as polyethylene powder or a lubricant such as stearate.

The gelled negative electrode 3 is prepared, for example, by adding a gelling agent such as sodium polyacrylate to an alkaline electrolyte to form a gelled electrolyte and mixing and dispersing zinc alloy powder as the negative electrode active material in the gelled electrolyte. In order to improve the corrosion resistance of the gelled negative electrode, for example, high hydrogen-overvoltage metal such as indium and bismuth, compounds containing the metal, or a phosphoric acid ester type surfactant may be added. Also, to suppress the formation of zinc dendrites, for example, a trace amount of a silicon-containing compound such as silicic acid or a silicate may also be added.

The zinc alloy is preferably highly corrosion-resistant, and more preferably free from mercury, cadmium, or lead, or any of these in terms of environmental concerns. For example, the zinc alloy preferably contains elements such as indium, bismuth, and aluminum. These elements may be used singly or in combination of two or more of them. For example, the zinc alloy more preferably contains 0.01 to 0.1% by weight of indium, 0.005 to 0.02% by weight of bismuth, and 0.001 to 0.005% by weight of aluminum.

The gasket 5 can be obtained, for example, by injection molding nylon or polypropylene into predetermined dimensions and shape.

The negative electrode current collector 6 can be produced, for example, by pressing a wire rod made of, for example, silver, copper, or brass into the shape of a nail of predetermined dimensions. The surface of the negative electrode current collector 6 is preferably plated with tin or indium in order to prevent the impurity from mixing into the negative electrode current collector in the press working and obtain a cover-up effect.

The negative electrode terminal plate 7 can be obtained, for example, by pressing a nickel-plated steel plate or tin-plated steel plate into predetermined dimensions and shape.

Examples of the invention are hereinafter described in detail, but the invention is not to be construed as being limited to these Examples.

EXAMPLE 1

A AA-size cylindrical alkaline dry battery (LR6) as illustrated in FIG. 1 was produced in the following manner.
(1) Preparation of Positive Electrode Mixture Manganese dioxide powder (mean particle size: 35 μm) and graphite powder (mean particle size: 10 μm) were mixed together in a weight ratio of 94:6. This mixture was mixed with an alkaline electrolyte in a weight ratio of 100:2, fully stirred, and compression molded into positive electrode mixture flakes. The alkaline electrolyte used was an alkaline aqueous solution containing 35% by weight of potassium hydroxide and 2% by weight of zinc oxide. These positive electrode mixture flakes were crushed into granules, which were then classified into 10 to 100 mesh with a sieve. The classified granules were molded under pressure into a hollow cylindrical shape to obtain pellets of the positive electrode mixture 2.

(2) Preparation of Gelled Negative Electrode

Sodium polyacrylate powder (gelling agent), the same alkaline aqueous solution as that described above (alkaline electrolyte), and zinc alloy powder (negative electrode active material) were mixed together in a weight ratio of 0.8:33.6:65.6 to form the gelled negative electrode 3. The zinc alloy powder contained 0.020% by weight of indium, 0.010% by weight of bismuth, and 0.004% by weight of aluminum, had a mean particle size of 150 μm, and included 35% of particles of 75 μm and less.

(3) Assembly of Seal Assembly

The gasket 5 was prepared by injection molding 6,12 nylon into predetermined dimensions and shape.

The negative electrode terminal plate 7 was prepared by pressing a 0.4-mm thick nickel-plated steel plate into predetermined dimensions and shape.

The negative electrode current collector 6 was prepared by pressing a brass wire rod (copper content: 66% by weight, B62) with a volume resistivity of $64 \times 10^{-3}$ μΩ·m available from SAN-ETSU METALS Co., Ltd. into the shape of a nail having a total length of 36.0 mm and a body diameter of 1.40 mm by the known methods described in Japanese Laid-Open Patent Publications No. Hei 5-283080 and No. 2001-85018, and plating the surface with tin.

Thereafter, the head of the negative electrode current collector 6 was electrically welded to the central flat part of the negative electrode terminal plate 7, and the body of the negative electrode current collector 6 was forcefully inserted through the central opening of the gasket 5. In this way, the seal assembly 9 was produced.

(4) Assembly of Alkaline Dry Battery

Two pellets (one pellet: 5.5 g) of the positive electrode mixture 2 prepared in the above manner were placed in the battery case 1 and then pressed with a pressing tool so that they closely adhered to the inner wall of the battery case 1. The cylindrical separator 4 with a bottom was disposed inside the positive electrode mixture 2. The same alkaline electrolyte of 1.7 g as that described above was injected into the separator 4. After a predetermined time, 6.39 g of the gelled negative electrode 3 prepared in the above manner was filled into the separator 4. The separator 4 was a non-woven fabric composed mainly of polyvinyl alcohol fiber and rayon fiber. The open edge of the battery case 1 was sealed with the seal assembly 9, and the outer surface of the battery case 1 was covered with the exterior label 8.

Also, the inside of the alkaline dry battery thus obtained was radiographed with an X-ray fluoroscopic camera. As a result, the height of the filled gelled negative electrode 3 was 42.0 mm, and the length of the inserted negative electrode current collector 6 was 30.3 mm. That is, (the length L2 of the inserted negative electrode current collector 6)/(the height L1 of the filled gelled negative electrode 3) was 0.72.

EXAMPLES 2 TO 5 AND COMPARATIVE EXAMPLES 1 TO 2

While the height of the filled gelled negative electrode 3 was fixed at 42.0 mm in the same manner as in Example 1, the length of the inserted negative electrode current collector 6 was varied. Specifically, in assembling the seal assembly 9, the whole length of the negative electrode current collector 6 was varied to 37.0, 38.0, 39.5, 42.0, 34.5, and 44.0 mm. Also, in assembling the alkaline dry battery, the amount of the filled gelled negative electrode 3 was varied to 6.38, 6.38, 6.37, 6.36, 6.39, and 6.35 g. Except for these, AA-size alkaline dry batteries (LR6) were produced in the same manner as Example 1.

The inside of each of these alkaline dry batteries was radiographed with an X-ray fluoroscopic camera. As a result, the height of the filled gelled negative electrode 3 was 42.0 mm in all the batteries, and the length of the inserted negative electrode current collector 6 was 31.3, 32.3, 33.8, 36.3, 28.8, and 38.3 mm. That is, the L2/L1 ratio was 0.75, 0.77, 0.80, 0.86, 0.69, and 0.91.

COMPARATIVE EXAMPLE 3

In assembling the seal assembly, a negative electrode current collector 6 with a whole length of 33.0 mm was used. In assembling the alkaline dry battery, 6.40 g of the gelled negative electrode 3 was filled. Except for these, a AA-size alkaline dry battery (LR6) was produced in the same manner as Example 1.

Also, the inside of the alkaline dry battery was radiographed with an X-ray fluoroscopic camera. As a result, the height of the filled gelled negative electrode 3 was 42.0 mm, and the length of the inserted negative electrode current collector 6 was 27.3 mm. That is, the L2/L1 ratio was 0.65.

COMPARATIVE EXAMPLE 4

In assembling the seal assembly, a negative electrode current collector 6 with a whole length of 47.7 mm was used. In assembling the alkaline dry battery, 6.34 g of the gelled negative electrode 3 was filled. Except for these, a AA-size alkaline dry battery (LR6) was produced in the same manner as in Example 1.

Also, the inside of the alkaline dry battery was radiographed with an X-ray fluoroscopic camera. As a result, the height of the filled gelled negative electrode 3 was 42.0 mm, and the length of the inserted negative electrode current collector 6 was 42.0 mm. That is, the L2/L1 ratio was 1.00.

Next, the alkaline dry batteries of Examples 1 to 5 and Comparative Examples 1 to 4 were evaluated for their heavy load discharge characteristic in the following manner. This evaluation conforms to the discharge test method defined by ANSI C18.1M.

Five alkaline dry batteries of each kind were subjected to a pulse discharge in a constant-temperature environment at 21±2° C. until the closed-circuit voltage dropped to 1.05 V. The pulse discharge was performed by repeating the cycle of a 2-second discharge at a constant resistance of 1.5 W and a 28-second discharge at a constant resistance of 0.65 W 10 cycles per hour. In this way, the total number of cycles to the 1.05 V cut-off was obtained. When the number of cycles was greater than the number of cycles of the battery of Comparative Example 3 (corresponding to a commercially available AA-size alkaline dry battery) by 10% or more (i.e., 110 cycles or more), it was determined that the heavy load discharge characteristic was good.

The evaluation results are shown in Table 1. The number of cycles in Table 1 represents the average of the values of 5 batteries.

TABLE 1

| | Gelled negative electrode | | Alkaline dry battery | | | | | Evaluation of heavy load discharge characteristic Number of |
|---|---|---|---|---|---|---|---|---|
| | | | Negative electrode current collector | | Length L2 of inserted negative electrode | | | |
| | Height L1 (mm) | Amount filled (g) | Whole length (mm) | Body diameter (mm) | current collector (mm) | L2/L1 | (L2/L1)/Pmax | cycles of pulse discharge |
| Comparative Example 3 | 42.0 | 6.40 | 33.0 | 1.40 | 27.3 | 0.65 | 0.81 | 100 |
| Comparative Example 1 | 42.0 | 6.39 | 34.5 | 1.40 | 28.8 | 0.69 | 0.85 | 106 |
| Example 1 | 42.0 | 6.39 | 36.0 | 1.40 | 30.3 | 0.72 | 0.90 | 110 |
| Example 2 | 42.0 | 6.38 | 37.0 | 1.40 | 31.3 | 0.75 | 0.93 | 111 |
| Example 3 | 42.0 | 6.38 | 38.0 | 1.40 | 32.3 | 0.77 | 0.96 | 112 |
| Example 4 | 42.0 | 6.37 | 39.5 | 1.40 | 33.8 | 0.80 | 1.00 | 113 |
| Example 5 | 42.0 | 6.36 | 42.0 | 1.40 | 36.3 | 0.86 | 1.07 | 111 |
| Comparative Example 2 | 42.0 | 6.35 | 44.0 | 1.40 | 38.3 | 0.91 | 1.13 | 109 |
| Comparative Example 4 | 42.0 | 6.34 | 47.7 | 1.40 | 42.0 | 1.00 | 1.24 | 105 |

In the battery of Comparative Example 1 with a L2/L1 ratio of 0.69, the number of cycles was greater than that of the battery of Comparative Example 3 by 6%. In the batteries of Examples 1 to 5 of the invention with L2/L1 ratios of 0.72 to 0.86, the number of cycles was greater than that of the battery of Comparative Example 3 by 10% or more, thereby exhibiting good heavy load discharge characteristic. Also, among the batteries of Examples 1 to 5, the battery of Example 4 with a L2/L1 ratio of 0.80 provided the maximum number of cycles (113 cycles), thereby exhibiting particularly good heavy load discharge characteristic.

When the diameter of the body of the negative electrode current collector nail 6 is the same, the current collection area of the negative electrode current collector 6 and the volume of the filled gelled negative electrode 3 change, depending on the length of the inserted negative electrode current collector. If the length of the inserted negative electrode current collector 6 is too long, this can cause not only a decrease in the amount of the filled active material but also a degradation of current collection efficiency during heavy load discharge.

Next, an explanation is given based on the battery of Example 4 of the invention. The battery of Example 4 has the most excellent heavy load discharge characteristic (the maximum number of cycles). Hence, the L2/L1 ratio of the battery of Example 4, i.e., 0.80, is Pmax. The L2/L1 ratio of the battery of Example 1 is 0.90Pmax. The L2/L1 ratio of the battery of Example 5 is 1.07Pmax. Therefore, the range of the L2/L1 ratio within which good heavy load discharge characteristic can be obtained is from 0.90Pmax to 1.07Pmax.

When an alkaline dry battery is produced such that the L2/L1 ratio satisfies this range, it is possible to obtain the maximum current collecting efficiency and improve the heavy load discharge characteristic, regardless of the electrical characteristics of the gelled negative electrode. There are significant variations in the electrical characteristics of the gelled negative electrode. For example, some gelled negative electrodes use a very fine zinc alloy powder to ensure more contact points among the active material particles. Other gelled negative electrodes use a massive zinc alloy in the form of a curved wire, a ribbon, or cut pieces of such a wire or ribbon to ensure a network among the active material particles.

EXAMPLES 6 TO 9

Next, the diameter of the body of the negative electrode current collector 6 was examined. While the length of the inserted negative electrode current collector 6 was made constant, the diameter of the body of the negative electrode current collector 6 was varied. In this way, the current collection area was controlled and its effect on the heavy load discharge characteristic was examined.

In assembling the seal assembly, the whole length of the negative electrode current collector 6 was fixed at 39.5 mm, and the diameter of the body was varied to 1.30 mm, 1.20 mm, 1.10 mm, and 1.00 mm. Also, in assembling the alkaline dry battery, the amount of the filled gelled negative electrode 3 was varied to 6.39, 6.41, 6.43, and 6.44 g. Except for these, AA-size alkaline dry batteries (LR6) were produced in the same manner as in Example 4.

Also, the inside of each of the alkaline dry batteries of Examples 6 to 9 was radiographed with an X-ray fluoroscopic camera. As a result, the height of the filled gelled negative electrode 3 was 42.0 mm, and the length of the inserted negative electrode current collector 6 was 33.8 mm. That is, the L2/L1 ratio was 0.80.

COMPARATIVE EXAMPLES 5 AND 6

In assembling the seal assembly, the whole length of the negative electrode current collector 6 was fixed at 34.5 mm, and the diameter of the body was varied to 1.20 mm and 1.00 mm. Also, in assembling the alkaline dry battery, the amount of the filled gelled negative electrode 3 was varied to 6.43 and 6.46 g. Except for these, AA-size alkaline dry batteries (LR6) were produced in the same manner as in Comparative Example 3.

Also, the inside of each of the alkaline dry batteries of Comparative Examples 5 and 6 was radiographed with an X-ray fluoroscopic camera. As a result, the height of the filled gelled negative electrode 3 was 42.0 mm, and the length of the inserted negative electrode current collector 6 was 27.3 mm. That is, the L2/L1 ratio was 0.65, which is the same as the value of Comparative Example 3.

The alkaline dry batteries of Examples 6 to 9 and Comparative Examples 5 and 6 were evaluated for their heavy load discharge characteristic in the same manner as described above. The results are shown in Table 2.

TABLE 2

| | Galled negative electrode | | Negative electrode current collector | | Alkaline dry battery Length L2 of inserted negative electrode current collector (mm) | L2/L1 | Evaluation of heavy load discharge characteristic Number of cycles of pulse discharge |
|---|---|---|---|---|---|---|---|
| | Height L1 (mm) | Amount filled (g) | Whole length (mm) | Body diameter (mm) | | | |
| Example 4 | 42.0 | 6.37 | 39.5 | 1.40 | 33.8 | 0.80 | 113 |
| Example 6 | 42.0 | 6.39 | 39.5 | 1.30 | 33.8 | 0.80 | 115 |
| Example 7 | 42.0 | 6.41 | 39.5 | 1.20 | 33.8 | 0.80 | 116 |
| Example 8 | 42.0 | 6.43 | 39.5 | 1.10 | 33.8 | 0.80 | 116 |
| Example 9 | 42.0 | 6.44 | 39.5 | 1.00 | 33.8 | 0.80 | 115 |
| Comparative Example 3 | 42.0 | 6.40 | 33.0 | 1.40 | 27.3 | 0.65 | 100 |
| Comparative Example 5 | 42.0 | 6.43 | 33.0 | 1.20 | 27.3 | 0.65 | 99 |
| Comparative Example 6 | 42.0 | 6.46 | 33.0 | 1.00 | 27.3 | 0.65 | 98 |

In the batteries of Comparative Examples 3, 5, and 6 with a L2/L1 ratio of 0.65, the heavy load discharge characteristic was low, despite the fact that as the diameter of the body of the negative electrode current collector 6 decreases, the amount of the filled gelled negative electrode 3 increases. When the diameter of the body of the negative electrode current collector 6 decreases, the surface area of the negative electrode current collector 6 also decreases, and the reduced surface area is believed to have a large effect on the heavy load discharge characteristic in a region with an insufficient current collecting efficiency.

On the other hand, in the batteries of Examples 4 and 6 to 9 of the invention with a L2/L1 ratio of 0.80, since the current collecting efficiency was sufficient, the heavy load discharge characteristic did not lower even when the diameter of the body of the negative electrode current collector 6 decreased. Hence, the heavy load discharge characteristic improved due to the increase in the amount of the filled gelled negative electrode 3. In particular, in the batteries of Examples 6 to 9 with body diameters of 1.3 mm and less, the number of cycles increased by 15% or more, so that the heavy load discharge characteristic significantly improved.

In the case of the negative electrode current collector 6 with a body diameter of less than 1.0 mm, the mechanical strength is insufficient. Thus, in producing the seal assembly 9, this negative electrode current collector tends to bend when being forcefully inserted through the opening of the gasket 5, and is not practical. It is therefore preferable that the diameter of the body of the negative electrode current collector 6 be 1.0 mm or more.

Next, in view of the recent market trend requiring high performance and high reliability, the evaluation of the heat generated by the alkaline dry batteries of Examples of the invention in the event of an accidental short-circuit was made in addition to the evaluation of the heavy load discharge characteristic.

EXAMPLES 10 TO 12

In assembling the seal assembly 9, the negative electrode current collector was prepared from a brass wire rod (copper content: 76% by weight, B42) with a volume resistivity of $55 \times 10^{-3}$ μΩ·m available from SAN-ETSU METALS Co., Ltd., and the diameter of the body of the negative electrode current collector was varied to 1.20 mm, 1.10 mm, and 1.00 mm. In assembling the alkaline dry battery, the amount of the filled gelled negative electrode 3 was varied to 6.41 g, 6.43 g, and 6.44 g. Except for these, AA-size alkaline dry batteries (LR6) were produced in the same manner as in Example 7.

EXAMPLE 13

In assembling the seal assembly 9, the negative electrode current collector was prepared from a brass wire rod (copper content: 90% by weight, B15) with a volume resistivity of $40 \times 10^{-3}$ μΩ·m available from SAN-ETSU METALS Co., Ltd., and the diameter of the body of the negative electrode current collector was set to 1.20 mm. In assembling the alkaline dry battery, 6.41 g of the gelled negative electrode 3 was filled. Except for these, a AA-size alkaline dry battery (LR6) was produced in the same manner as in Example 7.

EXAMPLE 14

In assembling the seal assembly 9, the negative electrode current collector was prepared from a copper wire rod (C21) with a volume resistivity of $17 \times 10^{-3}$ μΩ·m available from SAN-ETSU METALS Co., Ltd., and the diameter of the body of the negative electrode current collector was set to 1.20 mm. In assembling the alkaline dry battery, 6.41 g of the gelled negative electrode 3 was filled. Except for these, a AA-size alkaline dry battery (LR6) was produced in the same manner as in Example 7.

EXAMPLE 15

In assembling the seal assembly 9, the negative electrode current collector was prepared from a silver wire rod with a volume resistivity of $16 \times 10^{-3}$ μΩ·m available from MITSUWA CHEMICALS Co., Ltd., and the diameter of the body of the negative electrode current collector was set to 1.20 mm. In assembling the alkaline dry battery, 6.41 g of the gelled negative electrode 3 was filled. Except for these, a AA-size alkaline dry battery (LR6) was produced in the same manner as in Example 7.

Also, the inside of each of the alkaline dry batteries of Examples 10 to 15 was radiographed with an X-ray fluoroscopic camera. As a result, in the same manner as in Example 7, the height of the filled gelled negative electrode 3 was 42.0 mm, and the length of the inserted negative electrode current collector 6 was 33.8 mm. That is, the L2/L1 ratio was 0.80, which is the same as the value of Example 7.

The alkaline dry batteries of Examples 10 to 15 were evaluated for their heavy load discharge characteristic in the same manner as described above. The evaluation results are shown in Table 3.

Further, the alkaline dry batteries of Examples 7 and 10 to 15 were externally short-circuited by connecting the positive electrode terminal 1a of the battery case 1 and the negative electrode terminal plate 7 with a nickel lead wire (thickness 0.1 mm, width 5 mm, length 100 mm). At this time, the surface temperature of the negative electrode terminal plate 7 was measured with a thermocouple to obtain the highest temperature. When the highest surface temperature was 100° C. or less, it was determined that the reliability of the battery was high. The measurement results are shown in Table 3. It should be noted that the number of test batteries was five, and that the values in Table 3 are the average values.

In the foregoing Examples, AA-size alkaline dry batteries were used, but alkaline dry batteries of other sizes such as the D-size and AAA-size can also produce essentially the same effects of the invention.

Also, in the foregoing Examples, manganese dioxide was singly used as the positive electrode active material, but the use of nickel oxyhydroxide alone as the positive electrode active material and the use of a combination of manganese dioxide and nickel oxyhydroxide as the positive electrode active materials can also produce essentially the same effects of the invention.

The alkaline dry battery of the invention has excellent heavy load discharge characteristic, and can be preferably used as the power source for electronic devices such as digital still cameras.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

TABLE 3

| | Negative electrode current collector | | | Evaluation of heavy load discharge characteristic | Evaluation of reliability Highest surface temperature of negative electrode |
|---|---|---|---|---|---|
| | Body diameter (mm) | Material | Copper content (%) | Volume resistivity ($\mu\Omega \cdot m$) | Number of cycles of pulse discharge | terminal plate upon short-circuit (° C.) |
| Example 7 | 1.20 | brass | 66 | $64 \times 10^{-3}$ | 116 | 102 |
| Example 10 | 1.20 | brass | 76 | $55 \times 10^{-3}$ | 116 | 96 |
| Example 11 | 1.10 | brass | 76 | $55 \times 10^{-3}$ | 116 | 97 |
| Example 12 | 1.00 | brass | 76 | $55 \times 10^{-3}$ | 115 | 99 |
| Example 13 | 1.20 | brass | 90 | $40 \times 10^{-3}$ | 116 | 91 |
| Example 14 | 1.20 | Copper | 100 | $17 \times 10^{-3}$ | 117 | 84 |
| Example 15 | 1.20 | Silver | 0 | $16 \times 10^{-3}$ | 116 | 84 |

The batteries of Examples 3 and 10 to 15 provided excellent heavy load discharge characteristic of 115 cycles or more.

Next, the generation of heat in the event of a short-circuit of an alkaline dry battery is described.

With respect to the generation of heat by the negative electrode current collector 6, there has been no countermeasure incorporated into conventional alkaline dry batteries in which the diameter of the body of the negative electrode current collector 6 is 1.3 to 1.5 mm and the L2/L1 ratio is approximately 0.65. The inventors believed it necessary to examine the generation of heat in the event of a short-circuit of an alkaline dry battery since the invention intends to improve the heavy load discharge characteristic.

In the alkaline dry batteries of Examples 10 to 15 of the invention with volume resistivities of $55 \times 10^{-3}$ $\mu\Omega \cdot m$ and less, the highest surface temperature of the negative electrode terminal plate 7 was 100° C. or less. Hence, the generation of heat by the negative electrode current collector 6 due to short-circuit current through the negative electrode terminal plate 7 was reduced. This result indicates that when the alkaline dry batteries of the invention are used as the power source for electronic or other devices, it is possible to suppress thermal damage to the circuit inside the electronic devices and obtain both good heavy load discharge characteristic and high reliability. It is noted that reducing the volume resistivity of the negative electrode current collector to less than $16 \times 10^{-3}$ $\mu\Omega \cdot m$ (in the case of silver) is technically difficult.

The invention claimed is:

1. An alkaline dry battery comprising:
   a cylindrical positive electrode mixture having a hollow and including at least one of manganese dioxide powder and nickel oxyhydroxide powder;
   a gelled negative electrode filled in the hollow of said positive electrode mixture, said gelled negative electrode including zinc alloy powder;
   a separator interposed between said positive electrode mixture and said gelled negative electrode;
   a negative electrode current collector inserted into said gelled negative electrode; and
   a negative electrode terminal plate electrically connected to said negative electrode current collector,
   wherein said alkaline dry battery is a AA-size alkaline dry battery, and
   the height L1 of said gelled negative electrode filled in the hollow of said positive electrode mixture and the length L2 of the portion of said negative electrode current collector inserted in said gelled negative electrode satisfy the relation (1):
   $0.72 \leq L2/L1 \leq 0.86$.

2. The alkaline dry battery in accordance with claim 1, wherein said negative electrode current collector has a volume resistivity of $16 \times 10^{-3}$ $\mu\Omega \cdot m$ or more and $55 \times 10^{-3}$ $\mu\Omega \cdot m$ or less.

3. The alkaline dry battery in accordance with claim 1, wherein said negative electrode current collector comprises copper or brass containing 76% or more of copper by weight.

4. An alkaline dry battery comprising:
- a cylindrical positive electrode mixture having a hollow and including at least one of manganese dioxide powder and nickel oxyhydroxide powder;
- a gelled negative electrode filled in the hollow of said positive electrode mixture, said gelled negative electrode including zinc alloy powder;
- a separator interposed between said positive electrode mixture and said gelled negative electrode;
- a negative electrode current collector having a rod-like body inserted into said gelled negative electrode and a head at one end of said body; and
- a negative electrode terminal plate electrically connected to the head of said negative electrode current collector, wherein said alkaline dry battery is a AA-size alkaline dry battery, and the body of said negative electrode current collector is in the shape of a column with a diameter of 1.0 to 1.3 mm, and the height L1 of said gelled negative electrode filled in the hollow of said positive electrode mixture and the length L2 of the portion of said negative electrode current collector inserted in said gelled negative electrode satisfy the relation (3):

$0.72 \leq L2/L1 \leq 0.86$.

5. The alkaline dry battery in accordance with claim 4, wherein said negative electrode current collector has a volume resistivity of $16 \times 10^{-3} \mu\Omega \cdot m$ or more and $55 \times 10^{-3} \mu\Omega \cdot m$ or less.

6. The alkaline dry battery in accordance with claim 4, wherein said negative electrode current collector comprises copper or brass containing 76% or more of copper by weight.

* * * * *